May 22, 1928.

O. S. HAGEN ET AL

CANNING HEATING RETORT

Filed April 21, 1927   2 Sheets-Sheet 1

1,670,619

INVENTORS
Orrin Seymour Hagen
Nova S. Coins
BY
Gilbright Arnold
ATTORNEY

May 22, 1928. 1,670,619
O. S. HAGEN ET AL
CANNING HEATING RETORT
Filed April 21, 1927  2 Sheets-Sheet 2

INVENTORS
Orrin Seymour Hagen
Nova S. Coins
BY
G. Wright Arnold.
ATTORNEY

Patented May 22, 1928.

1,670,619

UNITED STATES PATENT OFFICE.

ORRIN SEYMOUR HAGEN, OF BURLINGTON, AND NOVA S. COINS, OF MOUNT VERNON, WASHINGTON.

CANNING HEATING RETORT.

Application filed April 21, 1927. Serial No. 185,630.

Our invention relates to a canning heating retort. More particularly our invention relates to a canning retort having a cage disposed therein which has sloping channels, i. e., open compartments to which containers may be supplied.

For purposes of definiteness of illustration and clearness of explanation, we will describe our invention as applied to the canning of milk, but it is to be expressly understood that our invention extends to all fields where like problems and conditions obtain, including canning of fruits, vegetables and meats.

As applied to the canning of milk our device to the particular trade involved is known as a "sterilizer". According to present practice, the milk sterilizing retort has a revolvable member which has peripherally disposed compartments into which little truck-like members may be rolled. Within these truck-like members are steel trays disposed one upon the other, and each of these trays is filled with cans of milk completely closed and sealed. Each of the peripherally disposed compartments is of a size to receive two of the truck-like members, end to end, so that the retort is of 10 to 12 foot length. Condensed milk cans are ordinarily of three sizes—7½ oz. cans—1 lb. cans and 8 lb. cans. These sterilizers ordinarily have a capacity of 10,800—7½ oz. cans or 4608—1 lb. cans, or 384—8 lb. cans. It often happens in the sterilizing plants, however, that it is necessary to have the load for the container comprised of part 7½ oz. cans, part 1 lb. cans and part 8 lb. cans. When this is done, however, it is common practice to put in dummy trays to fill out any discrepancy in the heights of the trays that may result from the difference in the sizes of the cans, all of which is objectionable in that it not only reduces the capacity of the device but requires waste of time in inserting said dummy trays, and also the heat absorbed by said extra metal is wasted. Furthermore, manifestly much unnecessary extra weight is involved which means increased power consumption. In short, the present device has definite limitations as to size of cans which may be supplied to it, in that it must have dummy trays to make up the discrepancy in heights, said dummy trays being necessary to provide for tight packing. Another serious objection to the common practice design of sterilizer is the lack of uniformity of heating. Those cans which are in the trays which constitute the top and bottom of the stack of trays, together with the cans on the sides of the trays, manifestly are far more exposed to the heat than are those in the central portion of the stack. A fundamental condition for proper milk sterilizing is that there must be uniformity of heating. This particularly characterizes milk. In some of the leading milk canneries, great quantities of canned goods are rejected upon inspection before the same leave the factory on account of the failure to receive uniform heating. Another serious objection is the loss of time incident to this lack of uniform heat. This arises by reason of the fact that the heating must be very slowly increased up to the proper sterilizing temperature. If the necessary high temperature for sterilizing was introduced at once, it would leave much of the milk improperly cooked in the middle. By providing for uniformity we not only save time, but, by being able to introduce at once the high sterilizing temperature, also avoid imparting to the milk a brown color which is highly objectionable to the trade. The brown color which is so highly objectionable is due to the fact it gives the impression of artificiality, and does not look like natural milk. Also there is the serious interference of the flavor of the milk when it is given the brown color, so that for many uses the milk is not well suited.

A primary object of our invention is to overcome these objections, and to provide a device which will result in uniformity of heating of the cans of milk.

After the cans of milk are sterilized, i. e., heated, the common practice is to admit water to the retort to cool the contents, and the means to hold the truck-like members within the retort have been such as to limit the accessibility of the water to the individual cans precisely as it limits the exposure to the heating medium whether the same be steam or hot water. The importance of uniform cooling is no less than that of uniform heating because manifestly if the inner or less exposed cans are not cooled at the same time as the others, they will be cooking for a longer period than the cans on the outside. In short, uniform heating requires uniform cooling.

A primary object of our invention is to provide for access of the cooling water uniformly to all of the cans so that a uniformity of product is obtained. Difference in length of period of cooking or heating results in a difference of color and body of the product so that the consumer may be readily misled to mistake the quality of the product, having become accustomed to one standard character of canned milk, which is made to resemble ordinary cream as nearly as possible.

Furthermore, in sterilizing milk the common practice is to take the milk from the sterilizer to a device called the "shaker" where cans of milk are well agitated or shaken. This is for the purpose of removing what is known as a grain in the milk and a coagulation of the milk which results from cooking. This shaking has a direct bearing upon the viscosity of the product, and the viscosity in turn depends upon the length of time in cooking. Evidently if one can is cooked longer than another, then when the same is shaken there will result a great difference in viscosity which will make one can appear to be of about the thickness of ordinary cream while the next can which has been less cooked will have a viscosity which will make it look like very thin or skimmed milk, the shaking having the direct result of breaking down the degree of viscosity. All of this makes clear how fundamentally important it is in sterilizing milk to provide for uniformity of heating and uniformity of cooling.

Furthermore, in sterilizing in common practice the separate trays of cans of milk must be individually manually handled and placed in the truck-like device; then these must be manually shoved into the retort; manually withdrawn; and then the cans of milk manually transferred to wooden trays to be taken to the shaker above mentioned. This is necessary by reason of the fact that the cans become stained with rust if allowed to stand in the steel trays in which they rest when in the retort. It is found absolutely necessary that they be promptly removed from the trays to avoid disfiguring of the can by rust.

Serious objection obtains to this manual handling not only on account of the unnecessary labor element cost, but also on account of the delay in operation, and also to the highly objectionable injury by way of denting or jamming of the cans which often results when the cans, as is the ordinary practice, are tipped upside down into the wooden trays from the metal trays.

A primary object of our invention is to provide a sterilizing retort which will eliminate practically all of such manual handling and eliminate the use of trays so that the danger of disfiguring or staining the cans with rust is avoided, as well as that of jamming or denting the cans.

The above general objects of our invention, together with others inherent in the same, are obtained by the device illustrated in the following drawings, the same being preferred exemplary forms of embodiment of our invention throughout which drawings like reference numerals indicate like parts.

Figure 1:
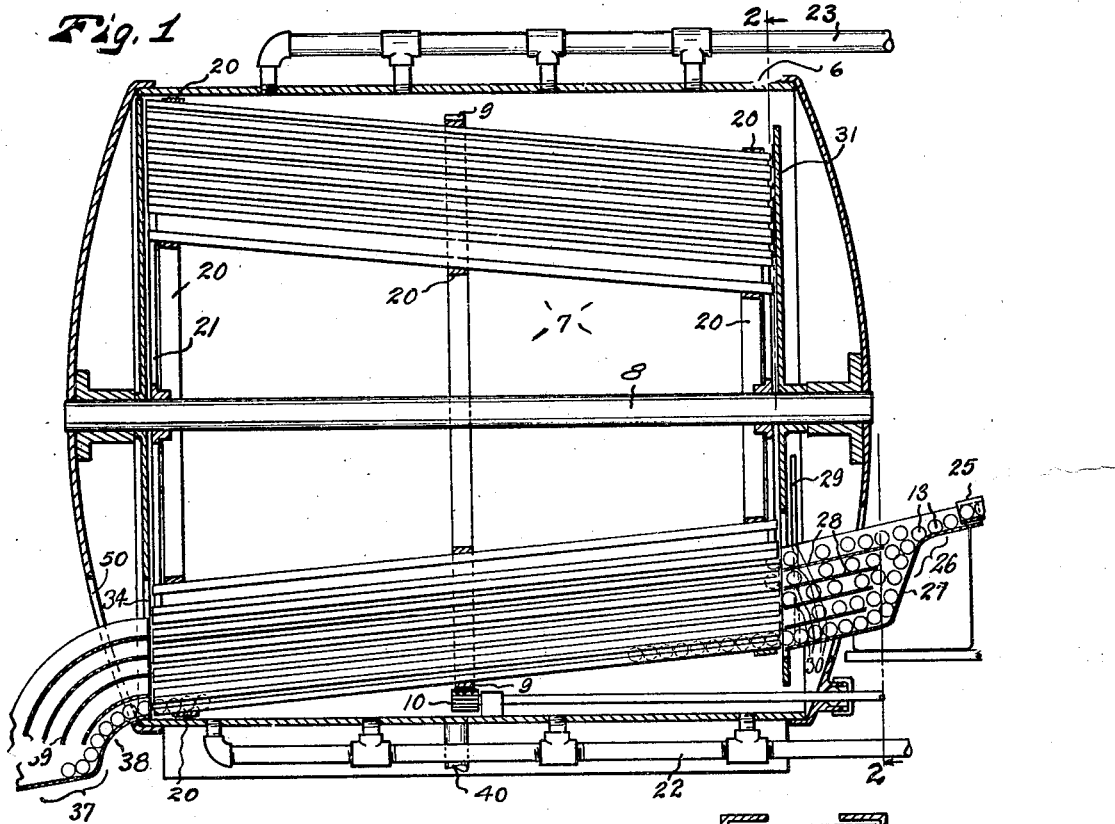
Figure 1 is a view in longitudinal section of the device embodying our invention.
Figure 3:
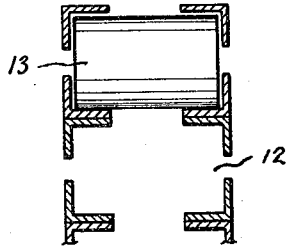
Fig. 3 is an enlarged view in cross-section of the sloping channel with a container disposed therein.

In a non-revolvable retort 6 the revolvable cage 7 is mounted on a shaft 8. The cage 7 is preferably of the form of a frustrum of a cone. A gear 9 fixedly mounted on the cage 7 engages driving gear 10 which driving gear is mounted on shaft 11 which in turn is connected to any suitable source of power.

The cage 7 is composed of a plurality of channels or container trackways 12 to which containers 13 may be supplied. The channels 12 are of different cross-sectional area in different peripheral portions of the cage. For example, those channels in sector 15 are of a size to receive seven and one half ounce containers while those channels in sector 16 are of a size to receive one pound containers and those channels in the axial portion 17 are of a size to accommodate eight pound containers. Those channels in peripherally oppositely disposed portions of the cage 6, for example, in 15 and 18 and 16 and 19 are of the same size. These various channels may be secured together by means of heavy metal hoops 20 at the ends of the cage and these hoops are supported by post 21, the gear 9 manifestly providing a reinforcing member for the central portion of the cage.

Heat is supplied to the interior of the retort by means of pipe 22 and likewise water is supplied to the interior of the retort for cooling purposes after heating by means of pipe 23.

Figure 5:
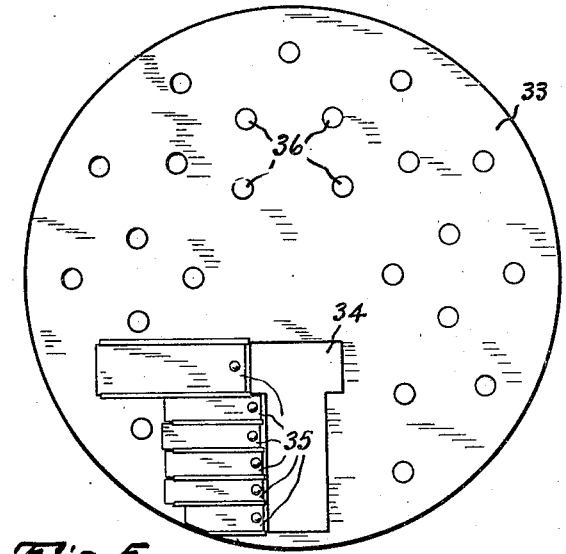
Fig. 5 is a view in front elevation of a can retaining plate for the unloading end of the retort.
Figure 2:
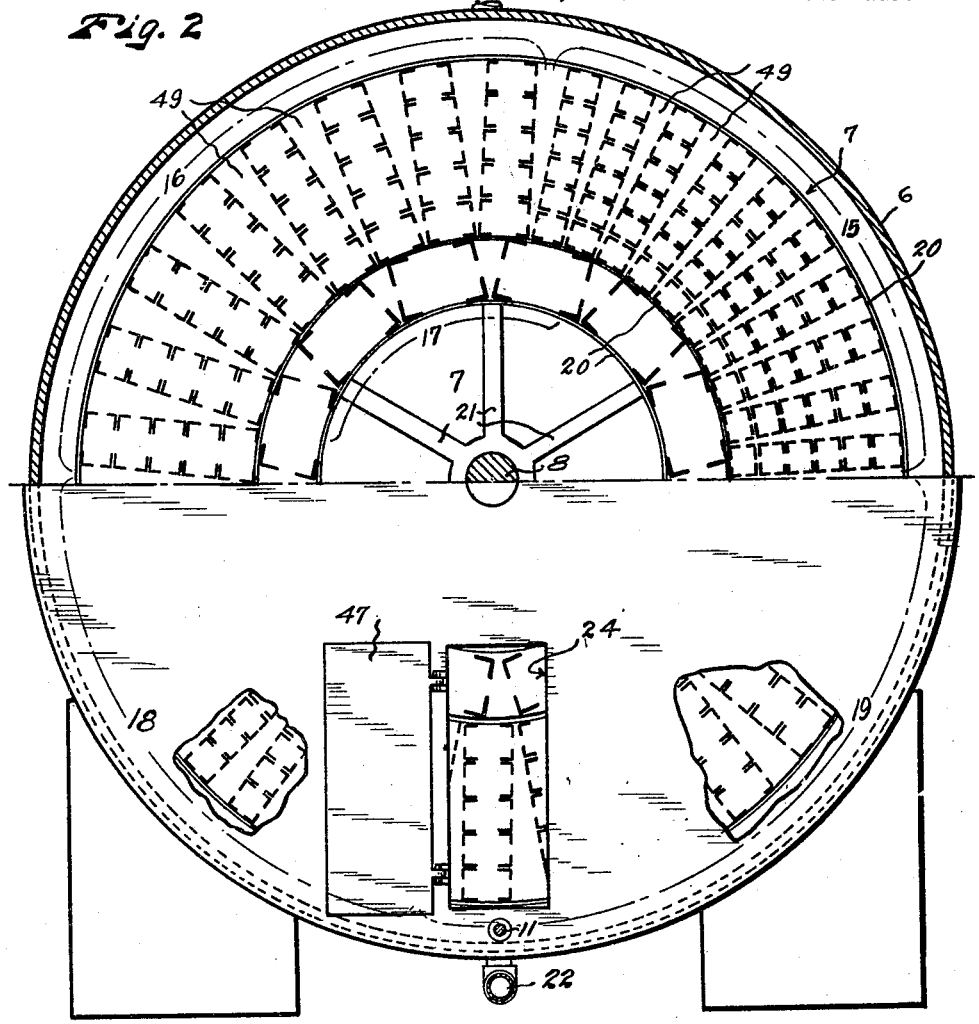
Fig. 2 is a view in cross-section on broken line 2—2 of Fig. 1.
Figure 4:
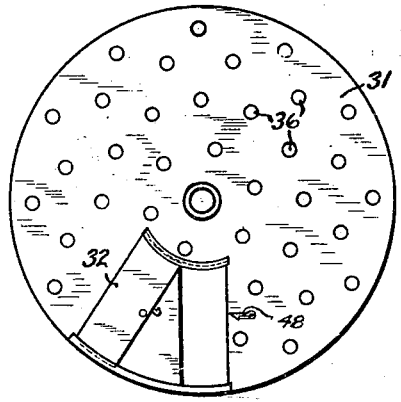
Fig. 4 is a view in front elevation of a can retaining plate for the loading end of the retort.

Through an opening 24 (Fig. 2) closable by door 47 in the loading end of the retort the containers 13 may be run from an incline chute 25 by means of a loader means 26, which chute is capable of withdrawal from the opening 24. Said loader comprises an inclined runway 27 and a plurality of superimposed runways 28 and a locking rod 29 slidably disposed in slots 30 located in the runways 28. A container retaining plate or disk 31 (Fig. 4) idly mounted on shaft 8 closes the loading end of the case, said disk having slidably mounted door 32. A second container retaining plate or disk 33 (Fig. 5) is provided at the opposite end of the cage for closing the same so that the containers 13 will not run out until released. Disk 33 is idly mounted upon shaft 8 so that it is free to be revolved upon that shaft. This disk or plate 33 is provided with a door opening 34 which opening is provided with a plurality of closing slides 35. These plates 31 and 33 are provided with perforations 36 so that the hot and cold water is free to pass therethrough. An unloader means 37 having a runway 38 and superimposed runways 39, is removably disposed with respect to the channels 12 for unloading purposes. The bottom of the retort 6 has a drain pipe valve 40 to remove water.

Figure 6:
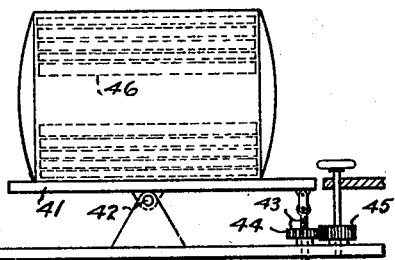
Fig. 6 is a modified form of the device embodying our invention.

In the modified form Fig. 6 a suitable platform 41 is pivotally mounted in its center at 42. The platform 41 may be provided with a jack screw means 43 which has gear 44 engageable by hand operated gear 45. Manifestly by tilting the floor 41 by means of the jack screw mechanism 43, the channels of the cylindrical cage 46 may be given a slope or incline position so that the containers may be rapidly loaded into the cage even though the channels in the cage have not a sloping angle other than at the time of loading and unloading.

The mode of operation of a device embodying our invention is as follows:

The door 47 of the retort 6 is moved into open position and the loading means 27 is pushed through the opening and the runways 27 and 28 are caused to register with the channels 12. Manifestly, a different loader must be employed for different sized cans to provide for such registration. The filled containers 13 are then allowed to roll down the incline 25 and follow down the runway 27, and then down the bottom-most channel. Also simultaneously the cans will run off runways 28 so that the loading is greatly expedited. The loader may be filled with cans to start so that time may be saved. The cans would start running as soon as locking rod 29 is pulled up. Having filled up the channels in a given radial plane, then the cage would be caused to revolve to the channel in the adjoining radial plane, and these filled with containers precisely as just described. When all the channels in a given portion or sector such as 15 are filled, then the cage 7 is revolved until the peripherally oppositely disposed sector as 18 is reached, and then the same sized can would be supplied to the channels of this portion of the cage. It will be understood that the proportions of the channels 12 are such as to permit the cans to freely travel therein by gravity. The other sectors of the cage 7 would next be filled with the size of cans or containers for which the channel proportions are adapted. Having filled the cage with the containers then the loader 27 may be withdrawn and the door 32 of the plate 31 would be pulled into closed position and there secured by any suitable latch 48. Next, the retort door 47 is closed, so that the retort is now steam tight. Thereupon power is transmitted to shaft 11 which causes the cage 7 to be revolved by means of the gear 10 engaging gear 9. The steam is then admitted to the interior of the retort and the temperature raised to the desired sterilizing point. Since the cans or retainers 13 are engaged only on their end portions by the track members forming the channel 12, the can is practically accessible to the steam on all sides. The steam quickly rushes around the cage and then down the converging passageways 49 between the channels 12. The converging form of these passageways 49 between the channels 12 retard the steam from rushing directly through the cage and causes the steam to flow around the cage and reach the center of the cage by coming down the various passageways practically from all sides instead of just from one side, thus a uniformity of steam introduction is provided as well as by the fact that the can is exposed practically on all sides to the action of the steam. In the meantime it will be understood that the cage 7 has been revolving during the heating operation. When the sterilizing period is completed then the steam is cut off and the cooling water is admitted through pipe 23. The accessibility of the can to the cooling water is just as great as to the steam and therefore the cooking is just as uniformly stopped as it was commenced.

Upon completing the cooling of the contents of the container the revolving of the cage 7 is stopped. The door opening closing means 35 in the unloading end of the container are opened, the water having been drained out through water drain valve 40 previous to opening the door. Since the cans will incline to run down the channels 12 they will press against can retaining plate 33 and since this is idly mounted on shaft 8 it will revolve with the cage 7. This plate 33 is manually revolved until the opening 34 registers with the unloading door opening 50 in the retort thereupon the unloading means 37 is moved into position with the runways 38 and 39 registering with the channel 12 and the sliding members 35 of the disk 33 are then opened and the cans allowed to run out. Manifestly, the manual handling of the containers is reduced to a minimum as gravity is used both for loading and unloading.

The period of sterilizing and the time involved in loading and unloading, are obviously greatly reduced. It cannot be too greatly emphasized as to the importance and advantage of having uniformity of introduction and uniform exposure of and to the heat. The reduction of the period of sterilization results particularly by reason of the fact that the steam may be introduced and the temperature raised almost immediately to the sterilizing point instead of the gradual raising of the temperature as heretofore rendered necessary, owing to the lack of uniformity of accessibility of the steam to the cans, said gradual raising of the temperature being necessary to avoid the over-cooking of those cans initially contacted by the steam. Moreover, not only does the uniformity of heat provide for reducing of cost of sterilizing by reducing the time, but it provides for a greatly improved product in that all over-cooking or heating may be avoided and the brown color thereby resulting positively avoided, and the flavor in no wise interfered with.

The modified form Fig. 6 would operate the same as the above retort, the channels being inclinable for purposes of loading and unloading.

Manifestly, the channels may be provided in a given retort to take a single sized can or as many different sized cans as the particular application may require, a retort adapted for three different sizes being set forth to illustrate the invention.

Obviously, changes may be made in the forms, dimensions and arrangement of the parts of our invention, without departing from the principle thereof, the above setting forth only preferred forms of embodiment.

We claim—

1. In a device of the character described a retort, a cage having the form of a frustum of a cone revolvably mounted therein, said cage having sloping channels to which containers may be supplied.

2. In a device of the character described a retort, a cage having the form of a frustum of a cone revolvably mounted therein, said cage having sloping channels to which containers may be supplied, said channels being of varying cross-sectional area for containers of varying sizes, the channels in peripherally opposite portions of the cage being of the same size.

3. In a device of the character described a retort, a cage having the form of a frustum of a cone revolvably mounted therein, said cage having sloping channels to which containers may be supplied, said channels being of varying cross-sectional area for containers of varying sizes, the channels in peripherally opposite portions of the cage being of the same size; and channels of a uniform size annularly disposed around the axis of said cage.

4. In a device of the character described a retort, a cage having the form of a frustum of a cone revolvably mounted therein, said cage having sloping channels to which containers may be supplied; and means operatively disposed at the ends of said channels whereby said channels may be closed.

5. In a device of the character described a retort, a cage having the form of a frustum of a cone revolvably mounted therein, said cage having sloping channels to which containers may be supplied, said channels being of varying cross-sectional area for containers of varying sizes, the channels in peripherally opposite portions of the cage being of the same size; and means operatively disposed at the ends of said channels whereby said channels may be closed.

6. In a device of the character described a retort, a cage having the form of a frustum of a cone revolvably mounted therein, said cage having sloping channels to which containers may be supplied, said channels being of varying cross-sectional area for containers of varying sizes, the channels in peripherally opposite portions of the cage being of the same size; channels of a uniform size annularly disposed around the axis of said cage; and means operatively disposed at the ends of said channels whereby said channels may be closed.

7. In a device of the character described, a retort; a cage revolvably mounted therein, said cage having container channels; and a container retaining disk disposed at the end of, and revolvably mounted with respect to, said cage, said disk having closable container passage ports disposed therein.

8. In a device of the character described, a retort; a cage having the form of a frustum of a cone revolvably mounted therein, said cage having channels inclined at an angle to the axis thereof; and container retaining disks disposed at the ends of, and revolvably mounted with respect to, said cage, said disks having closable container passage ports disposed therein.

In witness whereof we hereunto subscribe our names this 15th day of April, 1927.

ORRIN SEYMOUR HAGEN.
NOVA S. COINS.